United States Patent
Taylor

[15] 3,694,439
[45] Sept. 26, 1972

[54] TETRAHYDRO 1,3-OXAZINIUM COMPOUNDS

[72] Inventor: Lloyd D. Taylor, Everett, Mass.

[73] Assignee: Polaroid Corporation, Cambridge, Mass.

[22] Filed: Aug. 3, 1970

[21] Appl. No.: 60,350

Related U.S. Application Data

[62] Division of Ser. No. 687,347, Dec. 1, 1967, Pat. No. 3,576,795.

[52] U.S. Cl. ..........................260/244 R, 260/584 A
[51] Int. Cl. ................................................C07d 87/06
[58] Field of Search ..................................260/244 R

[56] References Cited

UNITED STATES PATENTS

| | | |
|---|---|---|
| 2,911,294 | 11/1959 | Eden......................260/244 R |
| 2,960,433 | 11/1960 | Eden......................260/244 R |
| 3,225,042 | 12/1965 | Dillard et al. ..........260/244 R |

OTHER PUBLICATIONS

Kortum et al. Pure and Applied Chemistry Vol. 1, pages 366, 375, 378, 391, 453– 454, 466, 470 & 516 relied on (1961). TP1.P8

Beilsteins Handbuch der Organischen Chemie 4th ed. Vol. 27, pages 11– 12 Berlin, Julius Springer, 1937. QD251.B4

Chemical Abstracts Vol. 64, Subject Index Part 2 E–O, page 2424S (Jan. – June 1966). QD1.A51

Cossar et al. J. Heterocyclic Chem. Vol. 2, page 433 relied on (1965) QD400.J6

Gurne et al. Chem. Abst. Vol. 61, column 9492 (1964). QD1.A51

Kirrmann et al. Bul. Soc. Chim. France 1963, page 2484 relied on. QD1.S4

Mannich et al. Chem. Abst. Vol. 26, pages 2966–2967 (1932). QD1.A51

*Primary Examiner*—Natalie Trousof
*Attorney*—Brown and Mikulka and Sheldon W. Rothstein

[57] ABSTRACT

A compound of the formula

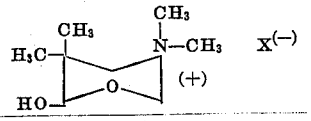

wherein X is an anion of an acid with an ionization constant of at least $10^{-2}$, has been found to provide a hardening function when utilized in conjunction with a polymeric material containing —SH, —NH$_2$, and/or —OH functional groups.

2 Claims, 1 Drawing Figure

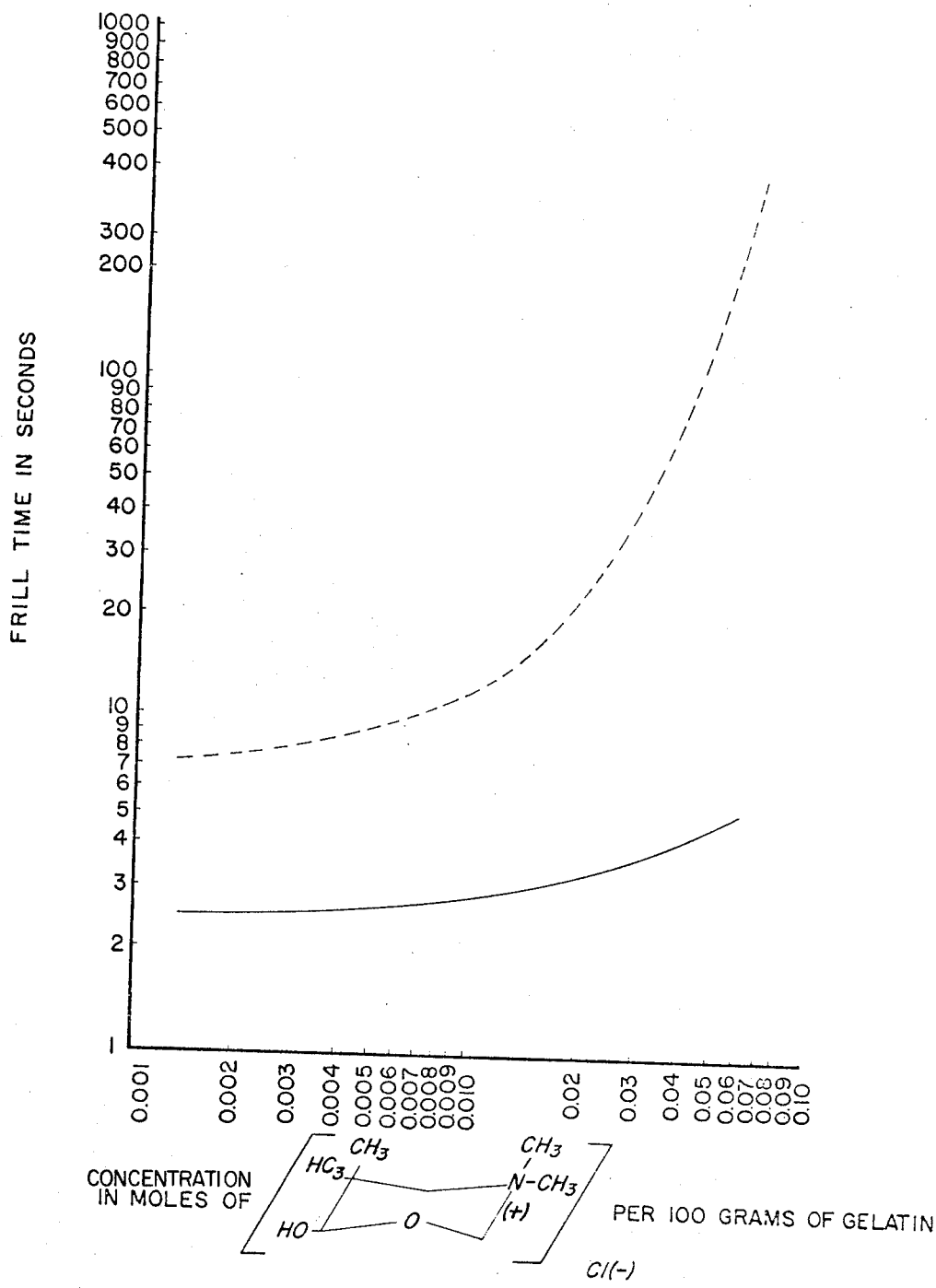

TETRAHYDRO 1,3-OXAZINIUM COMPOUNDS

This application is a division of U. S. Pat. application Ser. No. 687,347, filed Dec. 1, 1967, now U. S. Pat. No. 3,576,795.

The present invention relates to the modification of polymeric materials and, more particularly, to the modification of polymeric materials particularly adapted for employment in a photographic environment.

It is a primary object of the present invention to provide novel compounds particularly adapted to effect modification of polymeric materials containing functional hydroxyl, mercapto and/or amino groups.

A further object of the present invention is to provide novel cross-linking agents adapted to effect cross-linking of polymeric materials containing functional hydroxyl, mercapto and/or amino groups, wherein said cross-linking agents possess the property of being activated by contact thereof with an aqueous alkaline solution.

A still further object of the present invention is to provide novel cross-linking agents adapted to effect cross-linking of polymeric materials containing functional hydroxyl, mercapto and/or amino groups, wherein said cross-linking agents may be activated by contact with an aqueous alkaline solution and wherein one decomposition product of said cross-linking agents comprises formaldehyde in an amount sufficient to effect hardening of said polymeric materials, subsequent to the decomposition of said cross-linking agents.

Another object of the present invention is to provide novel hydrolyzable mono-aldehyde cross-linking agents which are capable of effecting cross-linking of polymeric materials containing functional hydroxyl, mercapto and/or amino groups and are particularly adapted for use in photographic film units in that they exhibit substantially no afterhardening during storage and impressive stability against the degradation effects of age, heat and/or humidity.

Other objects of the invention will in part be obvious and will in part appear hereinafter.

The invention accordingly comprises the process involving the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawing wherein the figure is a graphic illustration of certain frill characteristics of products fabricated in accordance with the present invention.

The aforementioned objects are accomplished, in accordance with the present invention, by reacting a polymeric material containing functional hydroxyl, amino and/or mercapto groups which are capable of reacting with aldehydes, such as, for example, gelatin, polyethylene imine, copolymers of acrylamide and 2-aminoethyl vinyl ether, deacetylated chitin, etc., with a 6-hydroxy-3,3,5,5-tetramethyl tetrahydro-1,3-oxazinium salt — which results from the reaction of 3-dimethylamino-2,2-dimethyl-propionaldehyde and formaldehyde in the presence of an acid with an ionization constant of at least $10^{-2}$. The specific acid utilized is determinative of the anionic constituent of the above salt.

In general, the synthesis of the novel cross-linking agents of the present invention may be visualized with reference to the following structural scheme:

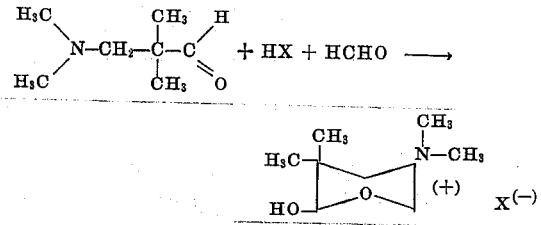

wherein X is an anion of an acid with an ionization constant of at least $10^{-2}$. Surprisingly, the above reaction has been found to result in the denoted cyclic condensate of the tertiary amine salt and formaldehyde when carried out under anhydrous conditions. It is quite immaterial which acid is chosen for utilization in the above reaction — the only restriction being that the acid have an ionization constant of at least $10^{-2}$. Exemplary acids are: hydrochloric; hydrobromic; hydrofluoric; sulfuric, nitric; perchloric; trichloro acetic; trifluoro acetic; etc.

It is theorized that, in general, tertiary amine salt condensates with formaldehyde in aqueous solution are in equilibrium with the corresponding N-methylol quaternary ammonium salts, which are, in turn, probably in equilibrium with the starting materials, as illustrated by the structural formulae below:

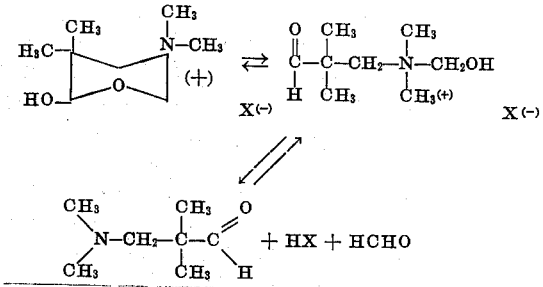

wherein X is as defined above. The anhydrous solution is found to contain approximately 60 percent of the cyclic structure, the equilibrium position probably being displaced to favor the production of the cyclic structure due to ring closure of the N-methylol group with the aldehyde function in a manner similar to that well known for the cyclic hemiacetal forms of sugars.

Under anhydrous conditions 100 percent of the material is of the cyclic structure. The novel cyclic cross-linking agents of the present invention are destroyed when contacted with alkali, yielding free dimethylamino-2,2-dimethyl propionaldehyde and formaldehyde — the latter of which provides a cross-linking or hardening function in the presence of polymeric materials containing functional hydroxyl, mercapto and/or amino groups, such as, for example, gelatin, Moreover, the compounds of the instant invention are found to be quite unusual in that in aqueous solution they possess both aldehyde and hydroxy functionality, and may be used in admixture with various polymeric materials thereby providing a convenient source of cross-linking material for resin hardening.

The greatest degree of hardening which may be achieved by a given amount of the novel cross-linking agents of the instant invention is found to occur when the polymeric material utilized predominates in functional amino groups since they more readily take part in the cross-linking mechanism than either hydroxy and/or mercapto group under alkaline conditions. It is recognized that gelatin, commonly utilized in photographic environments, is ideally suited for use in combination with the novel compounds described herein.

The amount of cross-linking agent employed to harden a given polymeric material is not considered critical as any amount added will result in cross-linking of said material. However, it is desired that the amount of cross-linking agent added be sufficient to insure the substantial hardening of the polymeric substance with which it it is employed. For example, when gelatin is utilized, a convenient amount of cross-linking agent may be in the order of about 0.001 to 0.1 mole per 100 gms. of gelatin, which results in an easily coatable solution containing hardened gelatin polymer.

The present invention will be illustrated in greater detail in conjunction with the following specific examples which set out the compounds of the present invention, their synthesis, and their utilization in a polymeric environment with which they are intended to react. These examples, however, are intended to be illustrative only and should not be taken in a limiting sense.

EXAMPLE 1

Adduct of Formaldehyde and 3-dimethylamino-2, 2-dimethylpropionaldehyde

Into a 250 ml. beaker were placed 16.6 g. (0.1 mole) 3-dimethylamino-2,2-dimethylpropionaldehyde hydrochloride. This salt is simply prepared by neutralizing the free aminoaldehyde with hydrogen chloride in ether. It was then dissolved in 25 ml. of water and 8.1 g. (0.1 mole) of 37 percent formaldehyde aqueous solution was added. The contents were allowed to stand for 1 hour and then poured into 2 liters of acetone with agitation.

6-hydroxy-3,3,5,5-tetramethyl tetrahydro-1,3-oxazinium chloride,

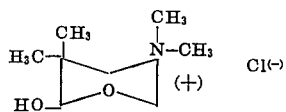

separated out as large crystals which were filtered and dried. 13 g. (66 percent) of product were obtained, m.p. 174° C. The compound may be recrystallized from ethanol-ether, if desired. However, in most cases, analytical samples may be obtained directly from the reaction.

ELEMENTAL ANALYSIS

|    | Percent Calculated | Percent Found |
|----|--------------------|---------------|
| C  | 49.1               | 49.1          |
| H  | 9.2                | 9.2           |
| N  | 7.15               | 7.2           |
| Cl | 18.2               | 18.4          |

The NMR spectrum of the above compound in perduetero-dimethyl sulfoxide is in keeping with the structure postulated. The NMR spectrum in $D_2O$, however, indicated a mixture of starting materials and the above compound in approximately equimolar amounts at room temperature. At elevated temperatures the concentration of the above decreased but returned to its former value as the temperature was lowered.

EXAMPLE 2

Aliquots comprising 0.1 cc. (0.0013 mole), 0.2 cc. (0.0026 mole), 1.0 cc. (0.013 mole), and 5.0 cc. (0.065 mole), respectively, of a solution containing 0.5 gm. of the product of Example 1, 10 cc. of water and 100 gms. of gelatin were mixed for 5 minutes at 38° C. with aliquots comprising 11.5 gms. of a silver iodobromide emulsion containing 2.5 gms. of gelatin, 1.5 cc. of saponin, 1.0 cc. of 5 percent glacial acetic acid, and 14 cc., 13 cc., 9 cc., and 4 cc., respectively, of water.

The resultant individual mixtures were coated on a cellulose acetate film base, dried, and subjected to frill tests to determine the resistance of the coatings. This is measured by determining the time required for separation or dissolution of the coating from the base upon immersion in distilled water at 50° C. and also upon immersion in an aqueous 5 percent sodium hydroxide solution at 20° C., using sample strips 1 inch wide by 5 inches long.

The frill test results ascertained are detailed in the drawing wherein the continuous curve represents the frill test conducted in water at 50° C. and the broken curve represents the frill test conducted in a 5 percent sodium hydroxide solution at 20° C.

The increased frill times observed when the sodium hydroxide solution is utilized as compared with those observed with distilled water are believed to be the result of the cross-linking agent's hydrolysis with the concomitant production of formaldehyde, as a by-product, in sufficient concentration to provide hardening of the gelatin film.

Since certain changes may be made in the above product without departing from the scope of the invention herein involved, it is intended that all matter contained in the above description or shown in the accompanying drawing shall be interpreted as illustrative and not in a limiting sense.

What is claimed is:

1. A compound capable of cross-linking mercapto-, amino- and hydroxy- functional polymers, said compound represented by the formula:

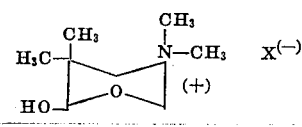

wherein X is an anion of an acid with an ionization constant of at least $10^{-2}$.

2. The compound of claim 1 wherein X is chloride.

* * * * *